(12) United States Patent
Koike et al.

(10) Patent No.: US 7,100,595 B2
(45) Date of Patent: Sep. 5, 2006

(54) DIAMOND BLADE

(75) Inventors: Akihiro Koike, Fujieda (JP); Takahiro Hirata, Fujieda (JP)

(73) Assignee: A.L.M.T. Corp., Taito-ku (JP)

( * ) Notice: Subject to any disclaimer, the term of this patent is extended or adjusted under 35 U.S.C. 154(b) by 0 days.

(21) Appl. No.: 10/509,196

(22) PCT Filed: Mar. 28, 2003

(86) PCT No.: PCT/JP03/04044

§ 371 (c)(1),
(2), (4) Date: Sep. 24, 2004

(87) PCT Pub. No.: WO03/084718

PCT Pub. Date: Oct. 16, 2003

(65) Prior Publication Data

US 2005/0121017 A1 Jun. 9, 2005

(30) Foreign Application Priority Data

Apr. 4, 2002 (JP) ............................ 2002-102242

(51) Int. Cl.
*B08D 1/04* (2006.01)
*B23F 21/03* (2006.01)

(52) U.S. Cl. ................... 125/13.01; 125/12; 125/15; 451/540; 451/541; 451/547; 451/548

(58) Field of Classification Search .............. 125/12, 125/13.01, 15; 451/540, 541, 547, 548
See application file for complete search history.

(56) References Cited

U.S. PATENT DOCUMENTS 3,048,160 A * 8/1962 Griffin et al. ................ 125/15
3,657,845 A 4/1972 Sekiya
5,518,443 A * 5/1996 Fisher ........................ 451/540

FOREIGN PATENT DOCUMENTS

| JP | 50-6079 | 3/1975 |
| JP | 8-90425 | 4/1996 |
| JP | 11207633 | 8/1999 |

* cited by examiner

*Primary Examiner*—Lee D. Wilson
*Assistant Examiner*—Shantese McDonald
(74) *Attorney, Agent, or Firm*—W. F. Fasse; W. G. Fasse (57) ABSTRACT

In relation to a blade cutting stone or concrete, a blade, preventing wearing of a core while preventing the core from wobbling, cuttable at a stable speed is provided. In a blade formed by providing slots on the outer peripheral edge of a circular core and fixing a superabrasive layer to a portion of the outer peripheral surface of the core located between the slots, the superabrasive layer consists of a first superabrasive layer having an extension formed by partially extending the superabrasive layer toward the inner periphery of the core and a second superabrasive layer. A reinforcing superabrasive layer extending from the outer periphery toward the inner periphery of the core is formed on the inner peripheral side of the second superabrasive layer while the reinforcing superabrasive layer is located closer to the outer periphery than a radial central portion of the core, and an outer peripheral end of the reinforcing superabrasive layer is located closer to the outer periphery than an inner peripheral end of the extension of the first superabrasive layer. The second superabrasive layer can also be provided with an extension having a relatively short radial length with respect to the extension of the first superabrasive layer.

12 Claims, 8 Drawing Sheets

DIAMOND BLADE

TECHNICAL FIELD

The present invention relates to a diamond blade, and more particularly, it relates to a blade for dry-cutting a hard and brittle material such as stone or concrete.

BACKGROUND ART

A diamond blade is used for cutting a hard and brittle material such as stone or concrete. A general example of this blade is a segmented blade shown in FIG. 12 formed by providing slots on the outer peripheral edge of a circular core while providing superabrasive layers on portions of the outer peripheral surface located between these slots, and the superabrasive layers are prepared by bonding superabrasive grains to each other through a metal bond or the like. The superabrasive layers are bonded to the core by brazing, welding or simultaneous sintering for bonding the superabrasive layers to the core simultaneously with sintering.

The superabrasive layers of the blade have recently been reduced in thickness, and the thickness of the core must also be reduced following this. When the thickness of the core is reduced, dust resulting from cutting enter clearances between the core and cutting grooves to wear particularly portions around junctions between the core and the superabrasive layers (hereinafter referred to as undercutting), leading to a significant problem. In other words, a thin core may be broken if worn with dust, while no problem arises in a thick core even if the core is worn with dust and slightly reduced in thickness.

Figure 13:
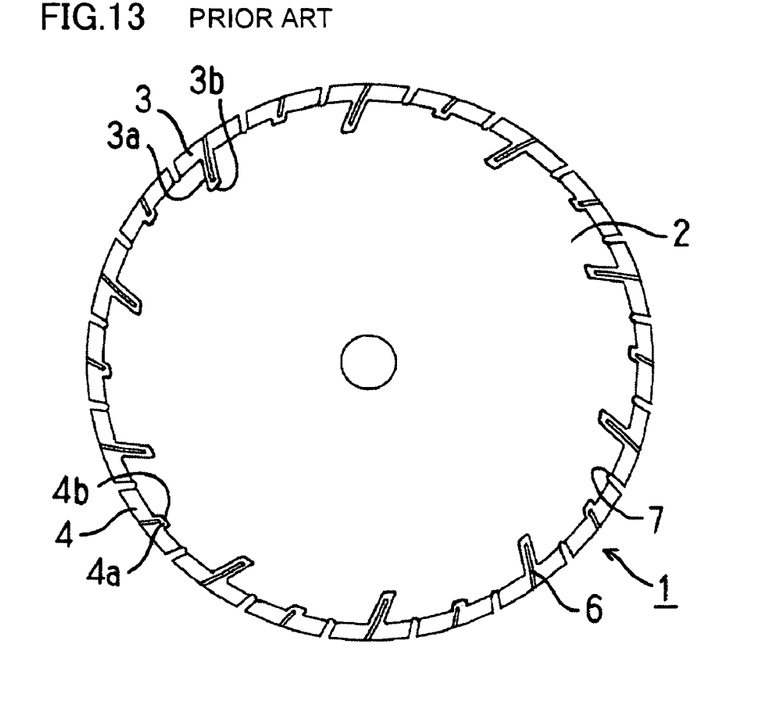
FIG. 13 is a side elevational view showing another conventional blade.

Japanese Patent Laying-Open No. 8-90425 describes a blade preventing the aforementioned undercutting. FIG. 13 shows this blade. This blade is formed by providing a plurality of slots on the outer peripheral edge of a core and fixing superabrasive layers to portions of the outer peripheral surface located between the slots while providing extensions by partially extending the superabrasive layers toward the inner periphery of the core, in order to prevent the undercutting in a segmented blade.

Figure 14:
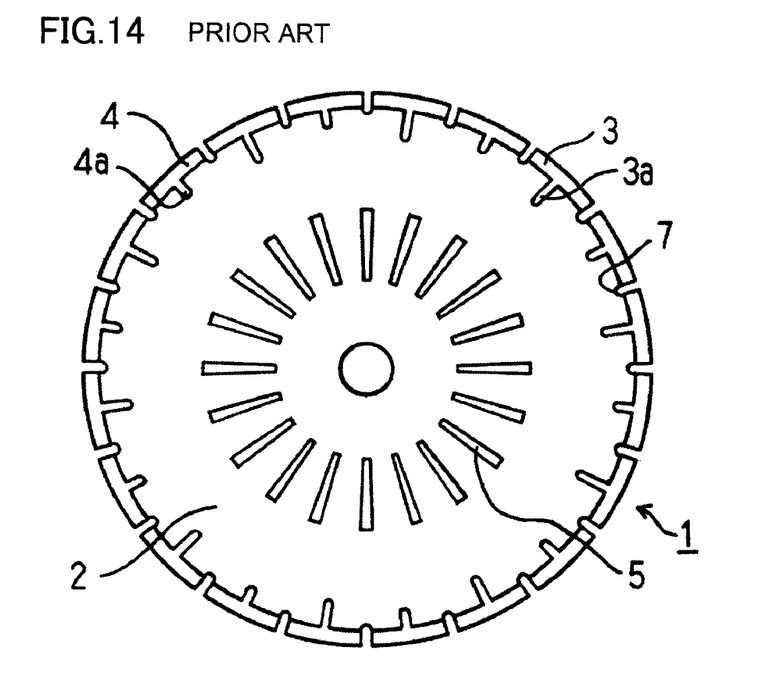
FIG. 14 is a side elevational view showing still another conventional blade.

Further, Japanese Patent Laying-Open No. 11-207633 describes a large-diameter blade of at least 250 mm in diameter preventing undercutting while preventing a core from wobbling in cutting. FIG. 14 shows this blade. This blade is formed by providing extensions by partially extending superabrasive layers toward the inner periphery of a core while mounting a plurality of core reinforcing diamond segments radially formed with a prescribed width on substantially intermediate positions between the outer periphery of the core and the center of the blade at prescribed intervals.

However, the aforementioned blade mounted with the core reinforcing diamond segments depends on the reinforcing diamond segments for preventing wobbling during cutting, and hence prevention of wobbling is limited and not necessarily satisfactory. In other words, the core is reinforced due to the rigidity of the radially formed diamond segments and hence circumferential rigidity of the core tends to be insufficient although radial rigidity is improved, to possibly cause wobbling. Further, the diamond segments are provided on the substantially intermediate positions between the outer periphery of the core and the center of the blade and hence there is an apprehension that tension adjustment of the core cannot be performed and the core cannot be completely inhibited from wobbling. The tension adjustment of the core is an operation of extending the inner peripheral side of the core with a pressure roll or extending the same by striking with a hammer thereby supplying stress in a direction for spreading the inner peripheral side and providing the outer periphery with circumferential tensile stress with this force. Thus, the outer peripheral side provided with the superabrasive layers serving as inserts is pulled for suppressing wobbling in cutting.

If dry cutting is performed with a blade not subjected to the aforementioned tension adjustment (tensioning), heat is generated around superabrasive layers to disadvantageously expand the core by thermal expansion and wobble the same. While wobbling can be prevented despite slight expansion of the outer periphery if tension adjustment is performed in this case, the aforementioned blade causes this problem due to impossibility of tension adjustment. Therefore, cutting must disadvantageously be frequently interrupted in order to cool the blade. While the aforementioned blade aims at preventing wobbling with reinforcing superabrasive layers, wobbling is frequently caused due to thermal expansion of the core resulting from heat generation during use of the blade in practice, and hence tension adjustment must be previously performed.

DISCLOSURE OF THE INVENTION

In consideration of the aforementioned circumstances, the present invention proposes a blade capable of preventing undercutting and further reinforcing a core with small wobbling.

A diamond blade according to the present invention is formed by providing slots on the outer peripheral edge of a circular core and fixing a superabrasive layer to a portion of the outer peripheral surface of the core located between the slots. The superabrasive layer includes a first superabrasive layer having an extension formed by partially extending the superabrasive layer toward the inner periphery of the core and a second superabrasive layer. A reinforcing superabrasive layer extending from the outer periphery toward the inner periphery of the core is formed on the inner peripheral side of the second superabrasive layer while the reinforcing superabrasive layer is located closer to the outer periphery than a radial central portion of the core and an outer peripheral end of the reinforcing superabrasive layer is located closer to the outer periphery than an inner peripheral end of the extension of the first superabrasive layer.

Preferably, a stressing layer is circumferentially continuously or intermittently formed around the radial central portion of the core.

Preferably, the second superabrasive layer is provided with an extension having a relatively short radial length with respect to the extension of the first superabrasive layer.

Preferably, the extension of the second superabrasive layer is formed to a side closer to the inner periphery than a line connecting innermost portions of adjacent slots with each other.

Preferably, the first superabrasive layer, the second superabrasive layer and the reinforcing superabrasive layer and the core are bonded to each other by simultaneous sintering.

Preferably, a bond for the reinforcing superabrasive layer consists of a bond reaching the maximum density at a lower temperature than bonds for the first superabrasive layer and the second superabrasive layer.

Preferably, through holes or through grooves are provided on portions of the core provided with the first superabrasive layer, the second superabrasive layer and the reinforcing superabrasive layer.

Preferably, the second superabrasive layer and the reinforcing superabrasive layer are discontinuously formed in the radial direction.

Preferably, the first superabrasive layer, the second superabrasive layer and the reinforcing superabrasive layer are formed with grooves.

BEST MODES FOR CARRYING OUT THE INVENTION

First Embodiment

Figure 1:
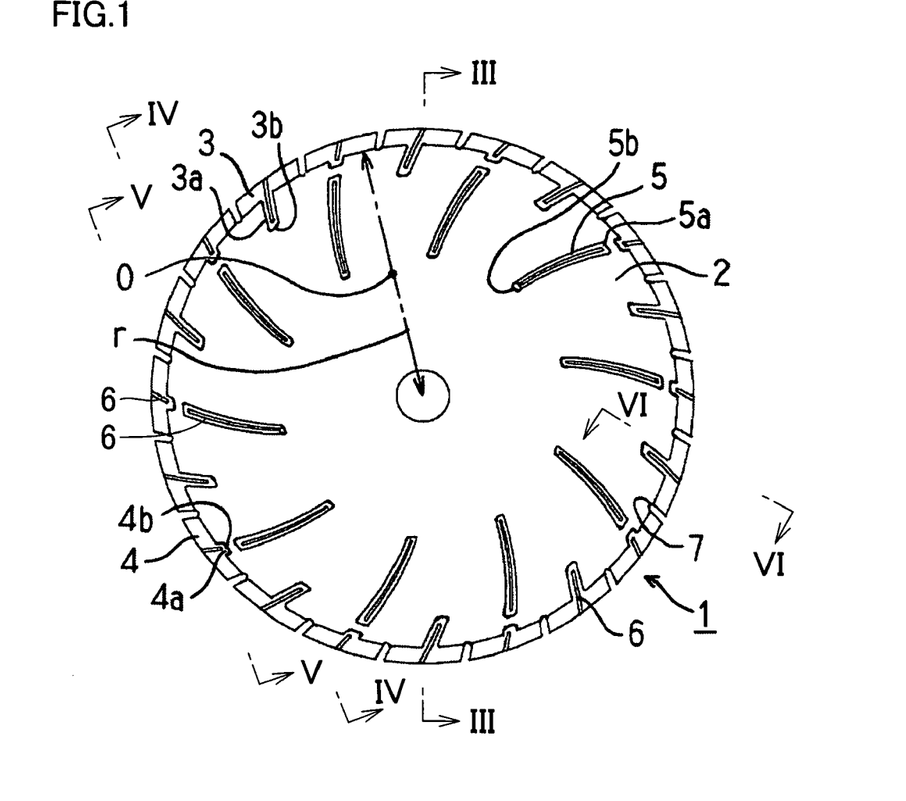
FIG. 1 is a side elevational view showing a blade according to a first embodiment of the present invention.
Figure 2:
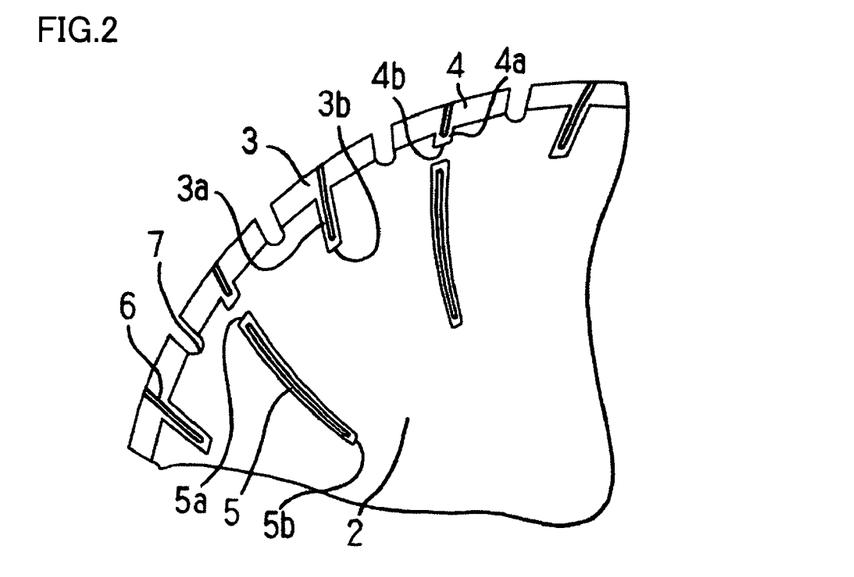
FIG. 2 is an enlarged side elevational view of superabrasive layer portions of the blade shown in FIG. 1.

FIGS. 1 and 2 show a blade according to the present invention. Slots 7 are provided on the outer peripheral edge of a core 2, and first superabrasive layers 3 and second superabrasive layers 4 are alternately bonded to portions of the outer peripheral surface of the core located between the slots 7. The first superabrasive layers 3 are provided with extensions 3a partially extended toward the inner periphery of the core 2, while the second superabrasive layers 4 are provided with extensions 4a partially extended toward the inner periphery of the core 2. Further, reinforcing superabrasive layers 5 are provided on the inner peripheral sides of the extensions 4a of the second superabrasive layers 4. The extensions 4a of the second superabrasive layers 4 and the reinforcing superabrasive layers 5 are separate from each other. Portions of the core 2 are thus located between these superabrasive layers so that the core 2 itself is increased in strength to hardly wobble in cutting. In this specification, all of the inner peripheral side, the outer peripheral side, the radial direction and the circumferential direction are defined with reference to those of the core 2.

Outer peripheral ends 5a of the reinforcing superabrasive layers 5 are located outward beyond inner peripheral ends 3b of the extensions 3a of the first superabrasive layers 3. Thus, the extensions 3a of the first superabrasive layers 3 and the reinforcing superabrasive layers 5 radially overlap each other to reinforce the outer peripheral side of the core 2 and prevent wobbling during cutting. Inner peripheral ends 5b of the reinforcing superabrasive layers 5 are located closer to the outer periphery than a central portion O in the radius r of the core. Thus, tensioning can be performed on the inner peripheral side from the central portion O, for preventing the core 2 from wobbling during cutting.

Through grooves are previously provided on portions of the core 2 provided with the first superabrasive layers 3 and the second superabrasive layers 4, while through holes are provided on portions provided with the reinforcing superabrasive layers 5. These through grooves and through holes are filled with powder mixtures of superabrasive grains and metal bonds, which in turn are cold pressed and thereafter sintered. A method of fitting moldings formed by previously cold pressing powder mixtures of superabrasive grains and metal bonds into the through grooves and the through holes and thereafter sintering the same can also be listed as another method. In particular, the first superabrasive layers 3 and the second superabrasive layers 4 bonded to the outer peripheral edge of the core 2 must be improved in bonding strength, and hence it is effective to form moldings of these superabrasive layers to hold the core 2 therebetween or form the outer peripheral edge in a shape having a convex section for forming the moldings to hold this portion therebetween, for sintering the same. According to this process, all the first superabrasive layers 3, the second superabrasive layers 4 and the reinforcing superabrasive layers 5 are bonded to the core in sintering.

A bond for the reinforcing superabrasive layers 5 is preferably prepared from a bond reaching the maximum density at a lower temperature than bonds for the first superabrasive layers 3 and the second superabrasive layers 4. This is effective for reliably pressure-sintering the first superabrasive layers 3 and the second superabrasive layers 4 when bonding the core 2 and the superabrasive layers to each other by sintering the superabrasive layers. This is because the reinforcing superabrasive layers 5 reach the maximum density by sintering before the sintering temperature reaches a level bringing the first superabrasive layers 3 and the second superabrasive layers 4 into the maximum densities due to the bond reaching the maximum density at a lower temperature than those for the first superabrasive layers 3 and the second superabrasive layers 4 even if moldings for forming the reinforcing superabrasive layers 5 are slightly large in thickness, not to inhibit pressing force to the first superabrasive layers 3 and the second superabrasive layers 4.

A pressurization layer (stressing layer) is circumferentially continuously or intermittently provided around the radial central portion O of the core 2. The pressurization layer can be continuously provided by working with a pressure roll, or can be intermittently provided by a method of striking with a hammer or the like. A portion pressurized with the pressure roll or the hammer is locally formed with a work-hardened layer, leading to formation of a thin portion on the core 2. The periphery of this pressurized portion so elongates as to slightly increase the circumferential length. Thus, the outer peripheral side of the core 2 is so tensioned as to prevent wobbling even if the outer peripheral side of the core 2 is slightly expanded due to heat generated during cutting.

The first superabrasive layers 3, the second superabrasive layers 4 and the reinforcing superabrasive layers 5 are preferably formed with grooves. This brings an effect of reducing frictional resistance with a workpiece for improving the cutting speed while effectively discharging dust and preventing the core 2 from undercutting. Further, such an effect is also attained that the portions of the grooves are pressurized by a die in simultaneous sintering to receive force in a direction spreading the circumferential length of the reinforcing superabrasive layers 5 for increasing bonding strength between the core 2 and the aforementioned three types of superabrasive layers.

Figure 3:
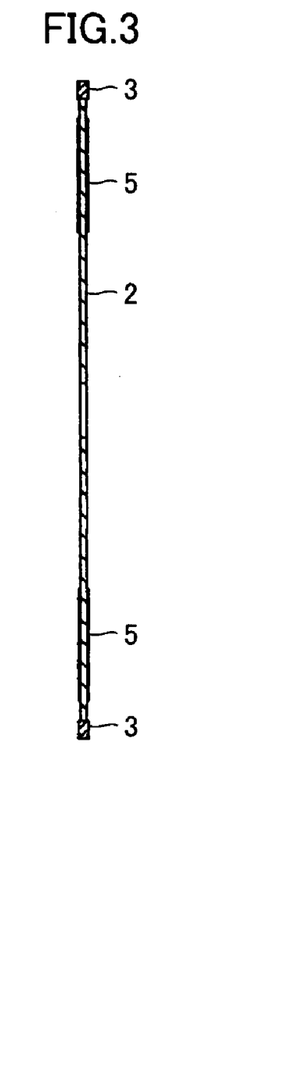
FIG. 3 is a sectional view taken along the line III—III in FIG. 1.

Referring to FIG. 3, the core 2 is in the form of a thin plate provided with the first superabrasive layers 3 on both ends thereof.

Figure 4:
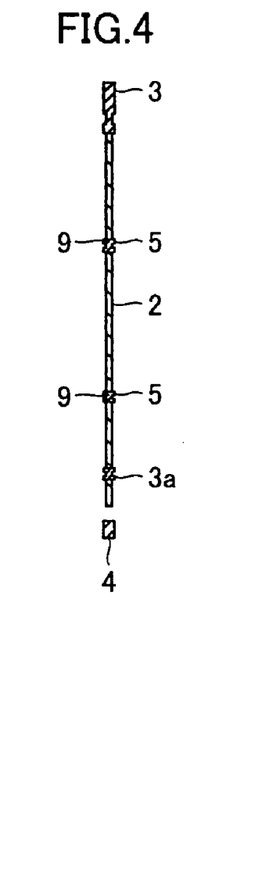
FIG. 4 is an end view along the line IV—IV in FIG. 1.

Referring to FIG. 4, the core 2 is provided with through holes 9, so that the reinforcing superabrasive layers 5 are fitted into these through holes 9.

Figure 5:
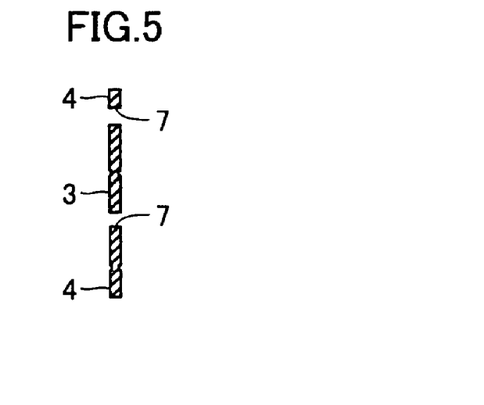
FIG. 5 is an end view along the line V—V in FIG. 1.

Referring to FIG. 5, the first superabrasive layers 3 and the second superabrasive layers 4 are alternately provided on the outer periphery of the core.

Figure 6:
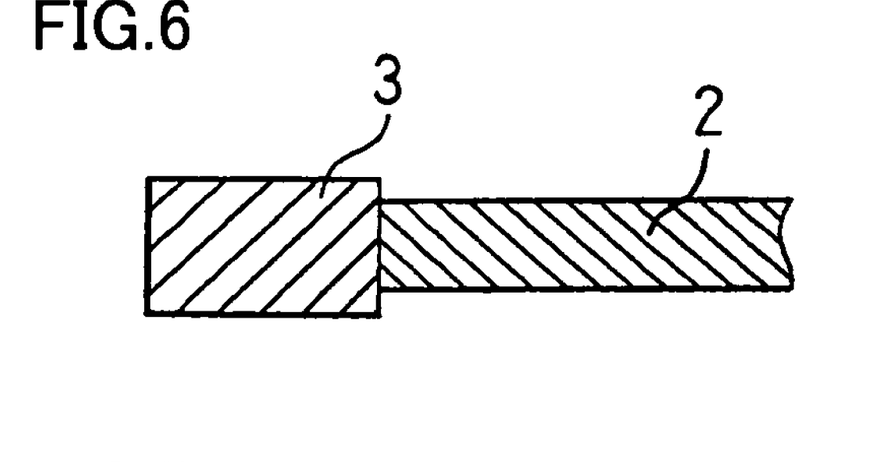
FIG. 6 is an end view along the line VI—VI in FIG. 1.

Referring to FIG. 6, an integrated first superabrasive layer 3 may be bonded to the core 2.

Figure 7:
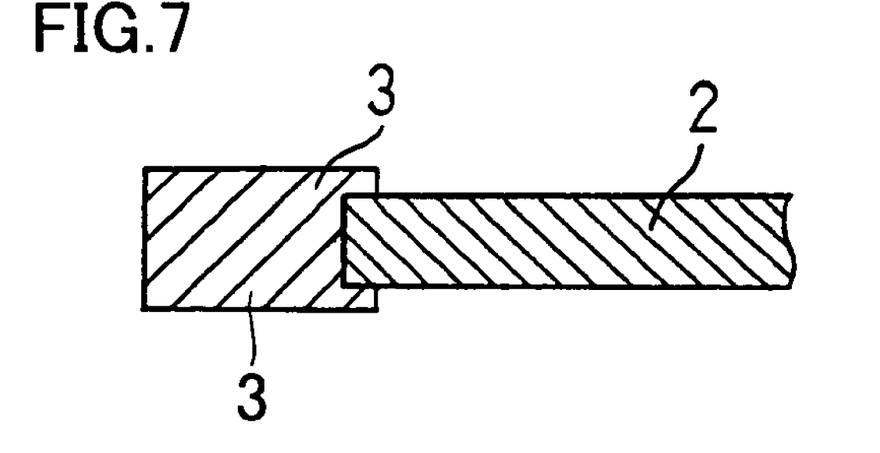
FIG. 7 is another end view along the line VI—VI in FIG. 1.

Referring to FIG. 7, an integrated first superabrasive layer 3 may be provided to hold the core 2.

Figure 8:
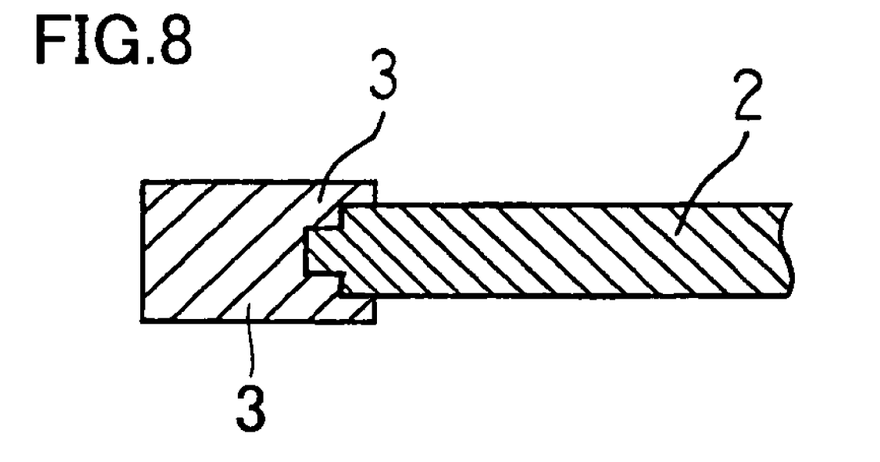
FIG. 8 is an end view according to still another aspect along the line VI—VI in FIG. 1.

Referring to FIG. 8, a projection may be provided on the forward end of the core 2, so that an integrated first superabrasive layer 3 is provided to hold this projection.

Second Embodiment

Figure 9:
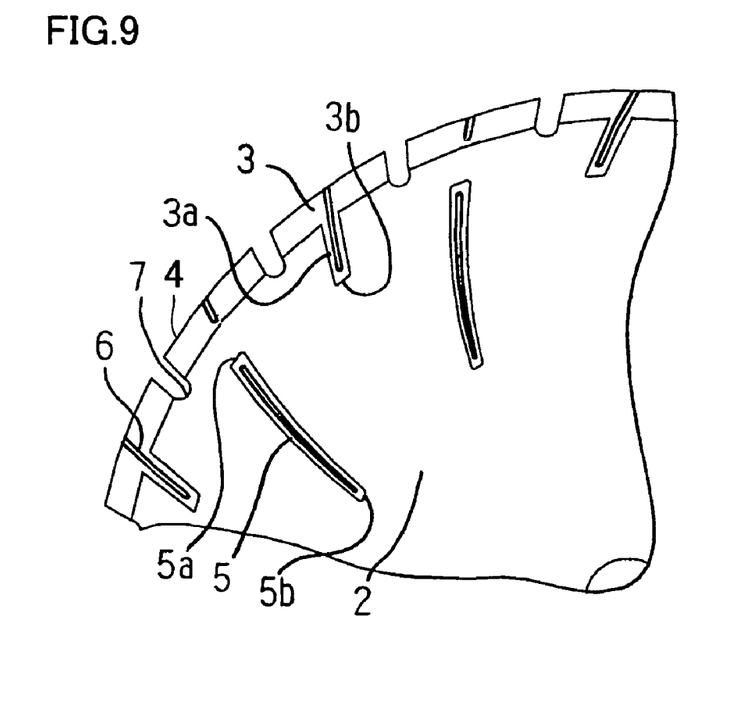
FIG. 9 is an enlarged side sectional view of superabrasive layer portions of a blade according to a second embodiment of the present invention.

Referring to FIG. 9, a blade according to a second embodiment of the present invention is different from the blade according to the first embodiment in a point that no extensions are provided on second superabrasive layers 4. This blade also has effects similar to those of the blade according to the first embodiment.

Third Embodiment

Figure 10:
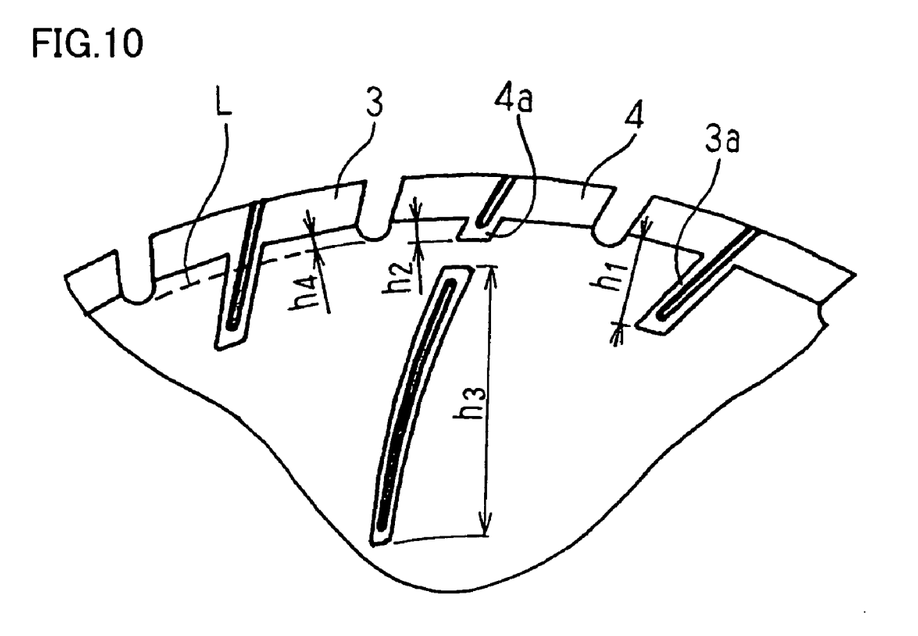
FIG. 10 is an enlarged side sectional view of superabrasive layer portions of a blade according to a third embodiment of the present invention.

Referring to FIG. 10, inner peripheral ends 4b of extensions 4a of second superabrasive layers 4 are located inward beyond a line connecting inner peripheral sides of adjacent slots 7 with each other in a diamond blade according to a third embodiment of the present invention. In other words, a relation expressed as h4<h2 holds in FIG. 10. There is an apprehension that first superabrasive layers 3 and the second superabrasive layers 4 are subjected to resistance in cutting and tend to be bent in portions of the line connecting the inner peripheral sides of the slots 7 with each other, and this is prevented due to reinforcement with extensions 3a and the extensions 4a. While no provision of the extensions 4a on the inner peripheral sides of the second superabrasive layers 4 is also in the range of the present invention, the extensions 4a are preferably provided on the inner peripheral sides of the second superabrasive layers 4 in view of further reinforcement of the core 2 as described above.

EXAMPLES

Test Example 1

A blade according to Example of the present invention and a blade according to comparative example were prepared, and each blade was mounted on a hand held (engine driven) high speed saw to be subjected to a concrete cutting test. As an evaluation method of the cutting test, an unreinforced concrete curb B (JIS A 5307) having a height of 250 mm and compressive strength of 350 kgf/cm$^2$ was downwardly cut from above so that a load was constant with a depth of cut of 100 mm, and this cutting was regarded as 1 cut. Therefore, the length of cut in 1 cut was 250 mm. This cutting was continued for evaluating an average cutting speed, dispersion of the cutting speed and a wearing pattern of a core after cutting 400 cuts (100 m). The details of cutting conditions are described below. FIGS. 15 to 18 are sectional views showing concepts of situations of wearing, for illustrating wearing patterns of each Example and comparative example.

(Cutting Conditions)
Machine: hand held (engine driven) high speed saw, output: 3.5 kW
Blade Size: φ305 mm
Depth of Cut: 100 mm
Workpiece: concrete curb B (JIS A 5307)
600 mm in width×170 mm in depth×250 mm in height
compressive strength: 350 kgf/cm$^2$, unreinforced, aggregate: river gravel
Cutting Method: the workpiece was manually cut from above and the blade was fed to attain a constant load
Cutting Distance: 250 mm/cut×400 cuts=100 m Example 1

Figure 11:
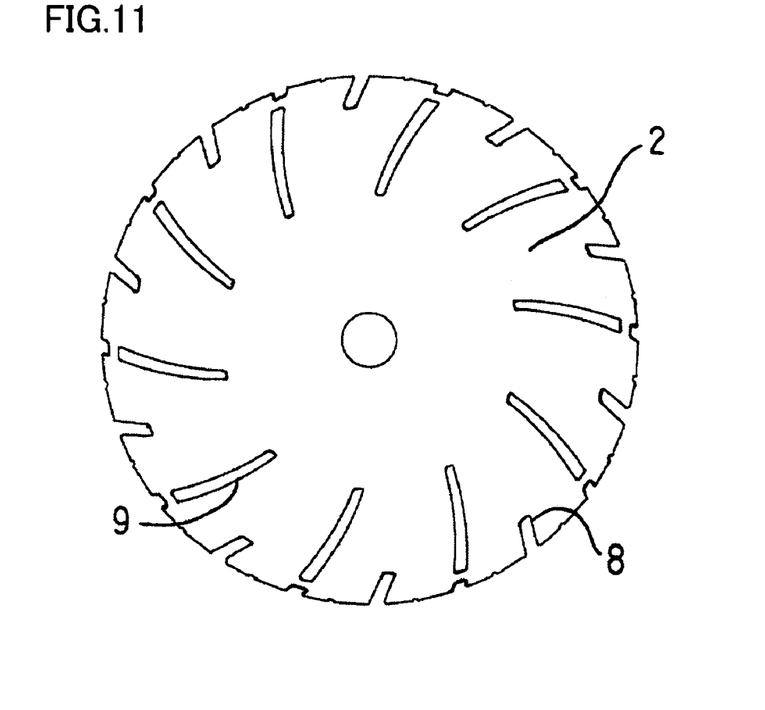
FIG. 11 is a side elevational view of a core used for the inventive blade.

A steel core 2 of 290 mm in diameter and 1.8 mm in thickness shown in FIG. 11 was prepared and set on a die for molding. Through holes 9 and large and small through grooves 8 are previously formed on this core 2. Powder formed by mixing a powder mixture of Co—Cu—Sn and diamond abrasive grains of #40/50 was prepared as the material for superabrasive layers, and this powder was charged in the outer peripheral portion of the core 2 and the portions of the through grooves 8 and the through holes 9, pressurized and integrally molded with the core 2. This was introduced into a sintering die, brought into a sintering furnace, heated with pressurization, held at 800° C. for a constant time and sintered for obtaining a blade by integrating the core 2 and superabrasive layers with each other. This blade was taken out from the sintering die and thereafter subjected to tension adjustment on the inner peripheral side of a circumferential line drawn by a radial central portion O of the core 2 for completing the inventive blade.

All of the thicknesses of first superabrasive layers 3, second superabrasive layers 4 and reinforcing superabrasive layers 5 are 2.7 mm, and steps with reference to the core 2 are 0.45 mm. The circumferential lengths of extensions 3a are 7.9 mm on the outer peripheral side and 7.1 mm on the inner peripheral side with a radial length h1 of 17 mm, the circumferential lengths of extensions 4a are 7.9 mm on the outer peripheral side and 7.7 mm on the inner peripheral side with a radial length h2 of 4.5 mm, and the circumferential lengths of the reinforcing superabrasive layers 5 are 7.5 mm on the outer peripheral side and 4.6 mm on the inner peripheral side with a radial length h3 of 52 mm. Thus, the circumferential lengths of the extensions 3a and 4a and the reinforcing superabrasive layers 5 are preferably reduced toward the inner peripheries. This is to prevent such a phenomenon that the circumferential speed is reduced on the inner peripheral sides to increase resistance on the inner peripheral sides upon rotation. The circumferential lengths of grooves 6 are set to 2 mm in the first and second superabrasive layers 3 and 4, and 2.0 mm on the outer peripheral side and 1.3 mm on the inner peripheral side respectively in the reinforcing superabrasive layers 5. The depth of the grooves 6 is 0.45 mm. The radial length h4 of slots of the core 2 was set to 3.3 mm. Inner peripheral portions of all of the extensions 3a and 4a and the reinforcing superabrasive layers 5 were located frontward along the rotational direction of the blade, and slightly rounded. Dust entering the grooves 6 smoothly flow to further improve dischargeability due to this shape. As to a method of tension adjustment, a pressure roll was applied to the inner peripheral side of the circumferential line drawn by the central portion O of the radius r of the core over a width of 15 mm for forming a stressing layer thereby performing tension adjustment on the overall blade.

Figure 15:
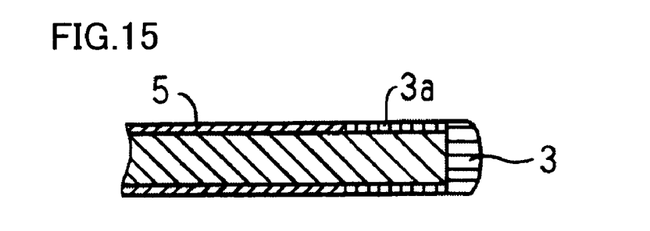
FIG. 15 is a sectional view showing wearing patterns of blades according to Examples 1 and 6.
Figure 20:
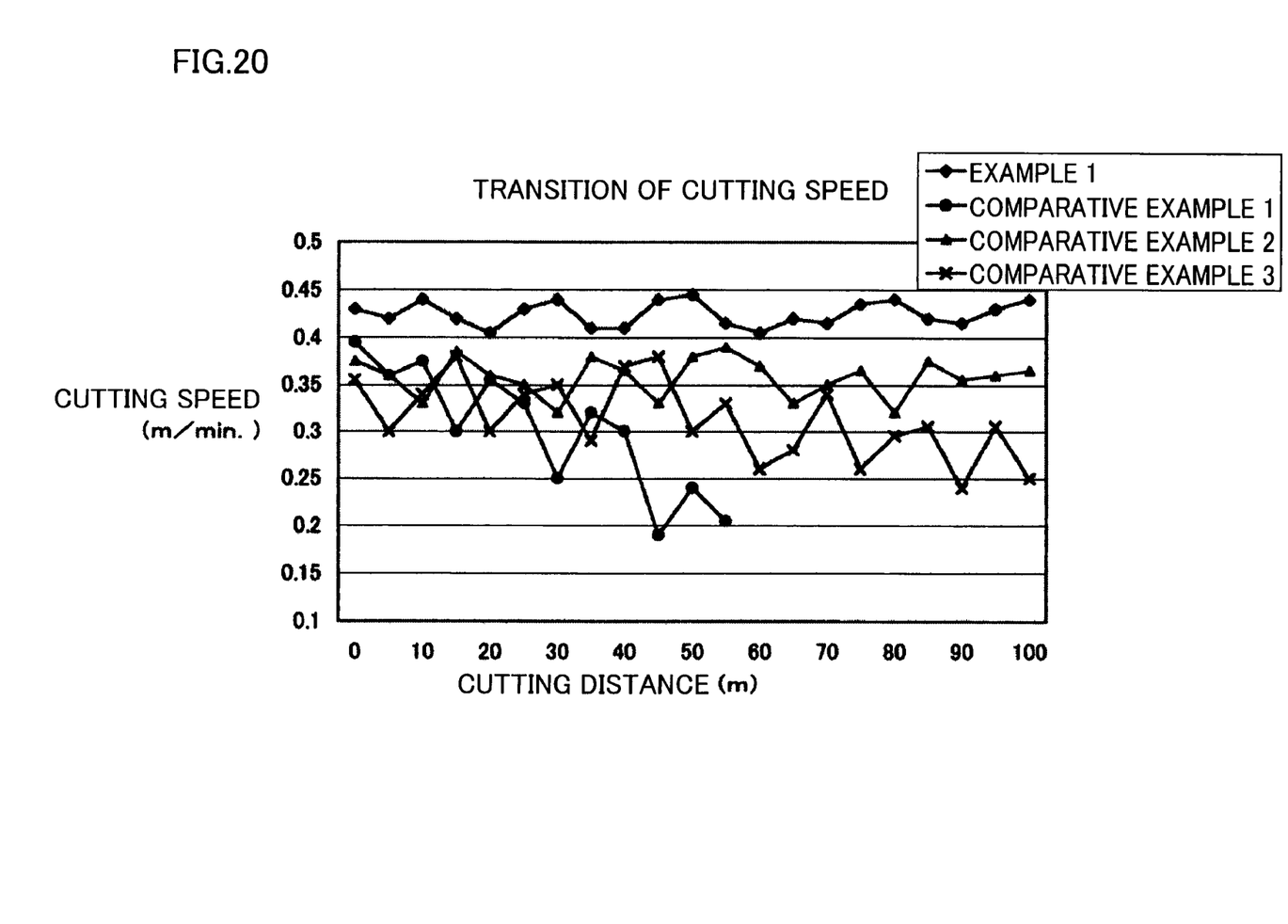
FIG. 20 is a graph comparing transition of cutting speeds of Example 1 and comparative examples 1 to 3.

When a cutting test was made with the obtained blade under the aforementioned conditions, the average cutting speed was 0.43 m/min. and dispersion of the cutting speed was 0.40 to 0.45 m/min., while the surface of the core 2 was slightly rubbed with a workpiece but wearing was hardly confirmable, and the state of a section on the outer peripheral side of the blade was as shown in FIG. 15. Transition of the cutting speed was as shown in FIG. 20, and it was possible to stably cut the workpiece from first to last.

Example 2

Figure 16:
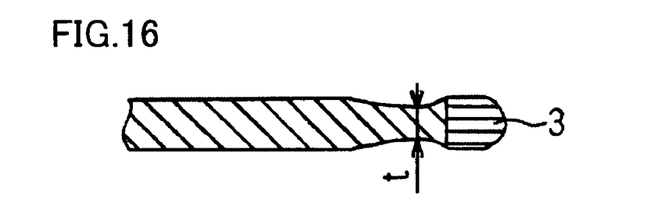
FIG. 16 is a sectional view showing wearing patterns of blades according to Examples 2 and 4 and comparative example 1.

A blade similar to the blade according to Example 1 was prepared with no extensions 4a of second superabrasive layers 4 (see FIG. 9). No through grooves 8 were provided on portions of a core 2 provided with the superabrasive layers 4 as a matter of course, while shapes and dimensions of the remaining portions were set identically to those in Example 1. When a cutting test was performed with the obtained blade under the aforementioned conditions, the average cutting speed was 0.43 m/min. and dispersion of the cutting speed was 0.40 to 0.46 m/min., while the surface portions of the core 2 located on the inner peripheral sides of the second superabrasive layers 4 were rubbed with a workpiece and worn to exhibit wearing wear of 0.12 mm at the maximum, and the state of a section around the second superabrasive layers 4 was as shown in FIG. 16.

Example 3

A blade similar to the blade according to Example 1 was prepared with no grooves 6 in first superabrasive layers 3, second superabrasive layers 4 and reinforcing superabrasive layers 5. Shapes and dimensions of the remaining portions were set identically to those in Example 1. When a cutting test was performed with the obtained blade under the aforementioned conditions, the average cutting speed was 0.41 m/min. and dispersion of the cutting speed was 0.37 to 0.43 m/min., and a phenomenon resulting from higher side friction of the respective superabrasive layers as compared with Example 1 was recognized. The surface of a core 2 was slightly worn due to dust get into back sides of the respective superabrasive layers along the rotational direction to exhibit wearing wear of 0.04 mm at the maximum, and a phenomenon resulting from inferior dischargeability for dust as compared with Example 1 was recognized.

Example 4

A blade similar to the blade according to Example 1 was prepared by increasing the radial length of slots 7 to 6.0 mm in a core 2. Shapes and dimensions of the remaining portions were set identically to those in Example 1. When a cutting test was performed with the obtained blade under the aforementioned conditions, the average cutting speed was 0.43 m/min. and dispersion of the cutting speed was 0.40 to 0.45 m/min. The surface of the core 2 was worn on the back sides of the slots 7 along the rotational direction to exhibit wearing wear of 0.04 mm at the maximum, and such a phenomenon was observed that dust collected in the slots 7 slightly worn the core 2. The state of a section on the back sides of the slots 7 along the rotational direction was as shown in FIG. 16.

Example 5

Figure 17:
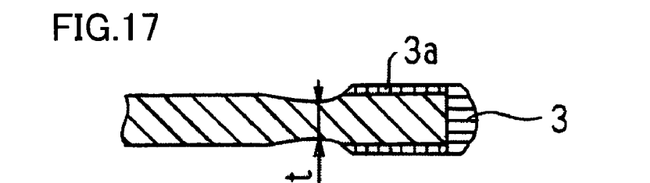
FIG. 17 is a sectional view showing wearing patterns of blades according to Example 5 and comparative example 2.

A blade similar to the blade according to Example 1 was prepared with no tension adjustment. Shapes and dimensions of the remaining portions were set identically to those in Example 1. When a cutting test was performed with the obtained blade under the aforementioned conditions, the average cutting speed was 0.36 m/min. and dispersion of the cutting speed was 0.33 to 0.41 m/min., while a phenomenon of reduction of the cutting speed was observed particularly in the latter half This is conceivably because a core 2 tended to wobble and gradually started to deform to increase side friction due to no tension adjustment performed on the blade. However, no problem of abrupt wobbling was caused due to formation of reinforcing superabrasive layers 5. The surface of the core 2 was rubbed with a workpiece to slightly cause wearing due to the wobbling to exhibit wearing wear of 0.02 mm at the maximum, and the state of a section on the outer peripheral side of the blade was as shown in FIG. 17.

Example 6

A blade similar to the blade according to Example 1 was prepared with a bond for reinforcing superabrasive layers 5 reaching the maximum density at a lower temperature than bonds for first superabrasive layers 3 and second superabrasive layers 4. Shapes and dimensions of the remaining portions were set identically to those in Example 1. When a cutting test was performed with the obtained blade under the aforementioned conditions, the average cutting speed was 0.45 m/min. and dispersion of the cutting speed was 0.41 to 0.48 m/min. While the cutting speed was higher than that in Example 1, this is conceivably because side friction was reduced to improve the cutting speed due to the abradable bond for the reinforcing superabrasive layers 5 reaching the maximum density at a lower temperature than the bonds for the first superabrasive layers 3 and the second superabrasive layers 4. While the surface of a core 2 was slightly rubbed with a workpiece, wearing was hardly confirmable and the state of a side surface on the outer peripheral side of the blade was as shown in FIG. 15.

Comparative Example 1

Figure 12:
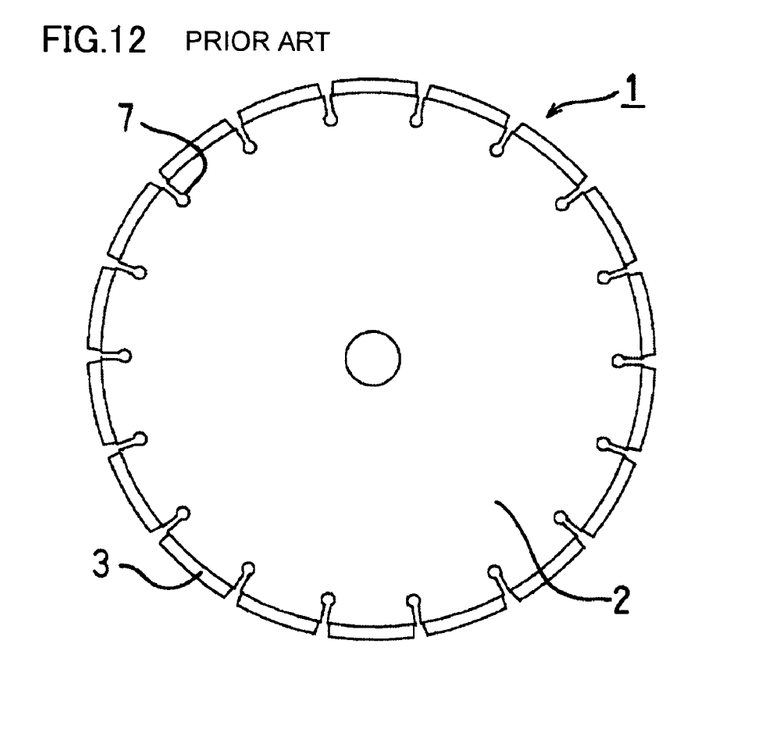
FIG. 12 is a side elevational view showing a conventional blade.

A blade shown in FIG. 12 was prepared as comparative example 1. This blade was in the same specification as Example 1 except a point that no extensions 3a and 4a were provided on superabrasive layers 3 and 4 and a point that no reinforcing superabrasive layers 5 were provided. Methods of molding, sintering etc. were also performed similarly to Example. When a cutting test was performed with the obtained blade under the aforementioned conditions, an underhead portion of a core 2 was worn while the side surfaces of the superabrasive layers 3 were also worn due to influence by dust, and the thickness of the superabrasive layers 3 reached the same size as that of unworn portions of the core 2 upon cutting by about 55 m to remarkably slow cutting speed and hence cutting was stopped. While the average cutting speed was 0.30 m/min. and dispersion of the cutting speed was 0.19 to 0.40 m/min., a phenomenon of reduction of the cutting speed was recognized particularly in the latter half. Transition of the cutting speed was as shown in FIG. 20. This is conceivably because side surfaces of the superabrasive layers 3 were so worn that the core 2 was readily rubbed with a workpiece to gradually increase side friction although the blade was subjected to tension adjustment. The surface of the core 2 was so rubbed with the workpiece that the inner peripheral sides of the superabrasive layers 3 were remarkably worn along the overall circumferential direction, to exhibit wearing wear of 0.31 mm at the maximum. The state of a section on the outer peripheral side of the blade was as shown in FIG. 16.

Comparative Example 2

A blade shown in FIG. 13 was prepared as comparative example 2. This blade was in the same specification as Example 1 except a point that no reinforcing superabrasive layers 5 were provided. Methods of molding, sintering etc. were also performed similarly to those in Example. When a cutting test was performed with the obtained blade under the aforementioned conditions, the average cutting speed was 0.36 m/min. and dispersion of the cutting speed was 0.32 to 0.39 m/min., and an underhead portion of the surface of a core 2 was prevented from wearing by extensions 3a and 4a, while portions on the inner peripheral side were frequently rubbed due to wobbling caused in cutting, to result in dispersion of the cutting speed. Transition of the cutting speed was as shown in FIG. 20. The wearing wear of the core 2 was 0.18 mm at the maximum. The state of a section on the outer peripheral side of the blade was as shown in FIG. 17.

Comparative Example 3

Figure 18:
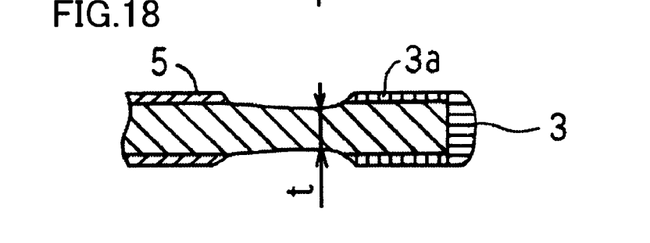
FIG. 18 is a sectional view showing a wearing pattern of a blade according to comparative example 3.

A blade shown in FIG. 14 was prepared as comparative example 3. This blade was in the same specification as Example 1 except a point that positions for providing reinforcing superabrasive layers 5 and shapes were different, a point that shapes of first superabrasive layers 3 and second superabrasive layers 4 were different and a point that a core 2 was subjected to no tension adjustment. Methods of molding, sintering etc. were also performed similarly to those in Example. When a cutting test was performed with the obtained blade under the aforementioned conditions, the average cutting speed was 0.31 m/min. and dispersion of the cutting speed was 0.24 to 0.38 m/min., and an underhead portion of the surface of the core 2 was prevented from wearing by extensions 3a and 4b and side surfaces of the core 2 and a workpiece were not rubbed in the initial stage of cutting due to the reinforcing superabrasive layers 5, while wobbling was caused as the cutting was continued and side surface portions of the core 2 located between the extensions 3a and the reinforcing superabrasive layers 5 were rubbed with the workpiece over the whole to result in wearing. Further, dispersion of the cutting speed was increased beyond that of the blade according to comparative example 2 due to wobbling during cutting. In addition, the cutting speed was reduced due to frictional resistance between the reinforcing superabrasive layers 5 and the workpiece in the latter half, in addition to wobbling. Transition of the cutting speed was as shown in FIG. 20. The wearing wear of the core 2 was 0.17 mm at the maximum, and the state of a section on the outer peripheral side of the blade was as shown in FIG. 18.

Test Example 2

Figure 19:
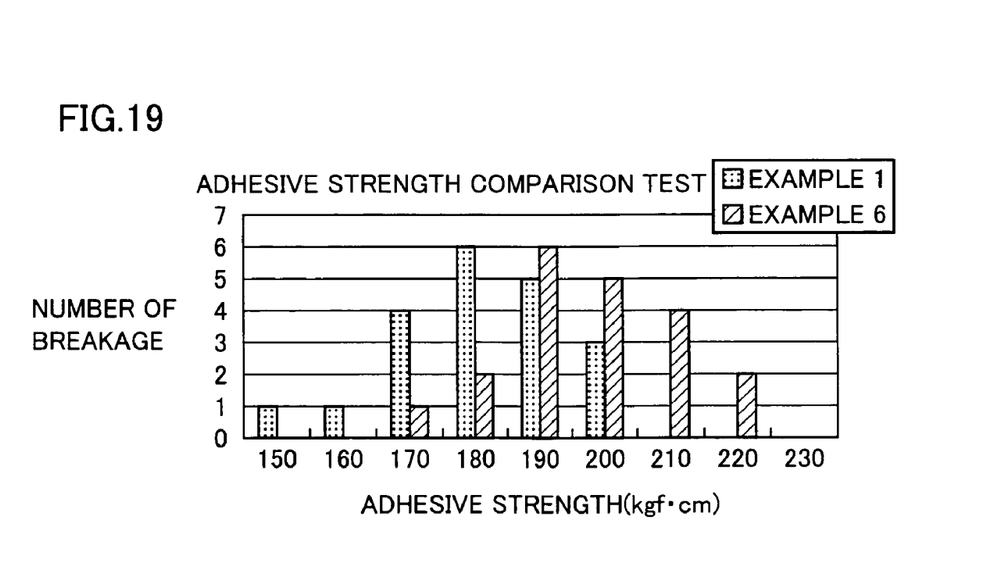
FIG. 19 is a graph comparing adhesion strength of Examples 1 and 6.

The aforementioned blades according to Examples 1 and 6 were used for performing a comparison test according to difference between bonds for the reinforcing superabrasive layers 5. As a comparison method, the levels of strength of the first superabrasive layers 3 bonded to the cores 2 were compared with each other. More specifically, the cores 2 were fixed and torques were applied to the first superabrasive layers 3 with a torque wrench, for regarding strength levels as bonding strength levels when the first superabrasive layers 3 were detached from the cores 2. FIG. 19 shows the results. As obvious from this figure, bonding strength was improved by about 10% in the blade (Example 6) employing the bond for the reinforcing superabrasive layers 5 reaching the maximum density at a lower temperature than that for the first superabrasive layers 3, and this is conceivably because the first superabrasive layers 3 were more completely sintered. This also applies to the second superabrasive layers 4, as a matter of course.

INDUSTRIAL APPLICABILITY

The present invention is employable in the field of a blade cutting a concrete block or the like.

The invention claimed is:

1. A diamond blade formed by providing slots on the outer peripheral edge of a circular core and fixing a superabrasive layer to a portion of the outer peripheral surface of said core located between said slots, wherein
said superabrasive layer includes a plurality of first superabrasive layers having an extension formed by partially extending said superabrasive layer toward the inner periphery of the core and a second superabrasive layer located between respective ones of said first superabrasive layers, a reinforcing superabrasive layer extending from the outer periphery toward the inner periphery of said core is formed on the inner peripheral side of said second superabrasive layer while said reinforcing superabrasive layer is located closer to the outer periphery than a radial central portion of the core and an outer peripheral end of said reinforcing superabrasive layer is located closer to the outer periphery than an inner peripheral end of the extension of said first superabrasive layer.

2. The diamond blade according to claim 1, wherein a stressing layer is circumferentially continuously or intermittently formed on the radial central portion of said core.

3. The diamond blade according to claim 1, wherein said second superabrasive layer is provided with an extension having a relatively short radial length with respect to the extension of said first superabrasive layer.

4. The diamond blade according to claim 3, wherein the extension of said second superabrasive layer extends radially closer to the inner periphery than do radially innermost portions of adjacent ones of said slots.

5. The diamond blade according to claim 1, wherein said first superabrasive layer, said second superabrasive layer and the reinforcing superabrasive layer and said core are bonded to each other by simultaneous sintering.

6. The diamond blade according to claim 5, wherein a bond for said reinforcing superabrasive layer consists of a bond reaching the maximum density at a lower temperature than bonds for said first superabrasive layer and the second superabrasive layer.

7. The diamond blade according to claim 1, wherein through holes or through grooves are provided on portions of said core provided with said first superabrasive layer, the second superabrasive layer and the reinforcing superabrasive layer.

8. The diamond blade according to claim 1, wherein said second superabrasive layer and said reinforcing superabrasive layer are discontinuously formed in the radial direction.

9. The diamond blade according to claim 1, wherein said first superabrasive layer, said second superabrasive layer and the reinforcing superabrasive layer are formed with grooves.

10. A diamond blade formed by providing slots on the outer peripheral edge of a circular core and fixing a superabrasive layer to a portion of the outer peripheral surface of said core located between said slots, wherein a reinforcing superabrasive layer extending in a whirly manner from the outer periphery toward the inner periphery of said core and separated from said superabrasive layer is formed on the inner peripheral side of said superabrasive layer while said reinforcing superabrasive layer is located closer to the outer periphery than a radial central portion of the core.

11. The diamond blade according to claim 10, wherein said superabrasive layer has an extension formed by partially extending the superabrasive layer toward the inner periphery of the core, and said extension extends in a whiny manner toward the center.

12. The diamond blade according to claim 11, wherein said extension is located on an extension line along said reinforcing superabrasive layer.

* * * * *

UNITED STATES PATENT AND TRADEMARK OFFICE
CERTIFICATE OF CORRECTION

| | | |
|---|---|---|
| PATENT NO. | : 7,100,595 B2 | Page 1 of 1 |
| APPLICATION NO. | : 10/509196 | |
| DATED | : September 5, 2006 | |
| INVENTOR(S) | : Koike et al. | |

It is certified that error appears in the above-identified patent and that said Letters Patent is hereby corrected as shown below:

Column 4,
Line 17, after "radius", replace "r" by --$\underline{r}$--;

Column 7,
Line 19, after "radius", replace "r" by --$\underline{r}$--;

Column 8,
Line 28, after "latter", replace "half This" by --half.  This--;

Column 12,
Line 13, after "in a", replace "whiny" by --whirly--.

Signed and Sealed this

Twentieth Day of March, 2007

JON W. DUDAS
*Director of the United States Patent and Trademark Office*